United States Patent [19]
Sato et al.

[11] Patent Number: 5,751,959
[45] Date of Patent: May 12, 1998

[54] COMMUNICATION TERMINAL, SUPERVISORY SYSTEM AND COMMUNICATION METHOD

[75] Inventors: Hiroaki Sato, Kawasaki; Hiroshi Okazaki, Yokohama, both of Japan

[73] Assignee: Canon Kabushiki Kaisha, Tokyo, Japan

[21] Appl. No.: 634,631

[22] Filed: Apr. 18, 1996

[30] Foreign Application Priority Data

Apr. 20, 1995 [JP] Japan .................................. 7-095197

[51] Int. Cl.⁶ .................................................. G06F 17/00
[52] U.S. Cl. .................................................. 395/200.35
[58] Field of Search ......................... 395/200.01, 188.01, 395/200.04, 200.12, 330, 332, 349, 200.35; 348/13, 15; 370/265; 345/179

[56] References Cited

U.S. PATENT DOCUMENTS

| | | | |
|---|---|---|---|
| 4,953,159 | 8/1990 | Hayden | 348/15 |
| 5,239,373 | 8/1993 | Tang | 348/15 |
| 5,555,373 | 9/1996 | Dayan | 395/188.01 |

FOREIGN PATENT DOCUMENTS

| | | | |
|---|---|---|---|
| 63-193682 | 8/1988 | Japan | H04N 7/14 |
| 3-231557 | 10/1991 | Japan | H04N 7/15 |
| 3278784 | 12/1991 | Japan | H04N 7/15 |
| 6141310 | 5/1994 | Japan | H04N 7/15 |

OTHER PUBLICATIONS

Freedman;Product Focus; "Videoconferencing Status a Moving Picture"; http://www.govtech.net/1995/gt/jul/products/videoconf.htm,1995.

Proceedings Of the International Conference On Communications (ICC), Geneva, May 23–26, 1993, vol. 1–2–03, Institute of Electrical And Electronics Engineers, pp. 1177–1182, Satoshi Toyosawa et al., "A Window Automanagement Scheme For A Multimedia–Multipoint Teleconference", p. 1181.

IBM Technical Disclosure Bulletin, vol. 36, No. 6A, Jun. 1, 1993, pp. 45–46, "Display Of Multiple Video Windows For Personal Conferencing".

*Primary Examiner*—Ellis B. Ramirez
*Attorney, Agent, or Firm*—Fitzpatrick, Cella, Harper & Scinto

[57] ABSTRACT

A display of a video received from a plurality of communication terminals or video input terminals is effected satisfactorily in accordance with a state at a transmission terminal side. A communication terminal connected to other communication terminals via a network, characterized by comprising receiving unit for receiving a video from the plurality of communication terminals, display unit for displaying the received video on a multi-window, command receiving unit for receiving a change indication command to change a display state of the video received from the plurality of communication terminals, and control unit for changing a display state of window displaying the video received from the communication terminals which have issued the change indication command, upon receiving the change indication command from the command receiving unit.

34 Claims, 10 Drawing Sheets

| HOST MACHINE NAME | RECEIVER PORT |
|---|---|
| host1 | 9999 |
| host2 | 9998 |
| host3 | 9997 |

5,751,959

COMMUNICATION TERMINAL, SUPERVISORY SYSTEM AND COMMUNICATION METHOD

BACKGROUND OF THE INVENTION

1. Field of the Invention

The present invention relates to a communication terminal, a supervisory system and a communication method.

2. Related Background Art

Conventionally, the user interface on the computer was configured such that one terminal was used by one user.

On the other hand, to handle different pieces of information on a limited screen of computer, a multi-window system using two or more windows at the same time has been utilized.

In recent years, with the development of softwares, commonly referred to as a teleconference system, a group-ware, or a client server system, data from different sources of information (terminals) which are distributed can be obtained for observation via a network at each of two or more of terminals, based on the configuration of such systems.

Such a system has a lot of information to be displayed, such as information of two or more users or the status of two or more terminals, whereby said information is displayed on a screen of computer using a multi-window.

However, since such system is configured with a multi-window in which each of different pieces of information is displayed in one window on a monitor, it has left much room for improvement concerning the reduced discrimination which arises when a window having necessary information displayed is hidden by any other windows.

SUMMARY OF THE INVENTION

An object of the present invention is to resolve part or all of the above-mentioned problems.

It is another object of the present invention to provide a communication terminal and method which allows for the effective use of a display screen.

It is a further object of the present invention to provide a communication terminal and method which allows for the effective use of the lines.

It is another object of the present invention to provide a communication device which can discriminate the state of communication rapidly.

To achieve the above objects, according to a preferred example of the present invention, there is disclosed a communication device comprising, input unit for inputting a video signal, discriminating unit for discriminating that the video represented by the video signal is not active for a predetermined time, and control unit for causing an icon to appear in place of the video signal input by the input unit in accordance with a discrimination by the discriminating unit.

It is another object of the invention to provide a communication device having new features.

Other objects and features of the present invention will be apparent from the following examples and the description of accompanying drawings.

DETAILED DESCRIPTION OF THE PREFERRED EMBODIMENTS

Figure 1:
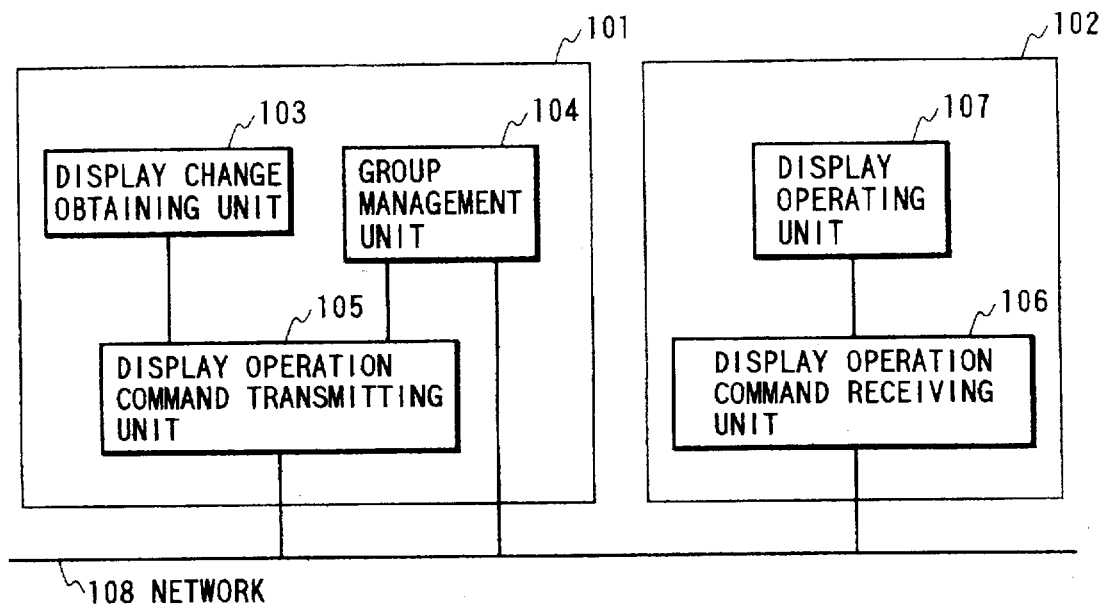
FIG. 1 is a block diagram showing one example of the present invention.

FIG. 1 is a diagram showing, the features of a terminal according to one example of the present invention, which is configured as follows.

101 is a transmission side terminal for transmitting the information to be displayed on the reception side, 102 is a reception side terminal for displaying the information received, 103 is a display change obtainable unit for automatically recognizing an operation instruction from the user or a change of display information within the transmission side terminal 101, 104 is a group management unit for managing the information regarding the terminal which receives and displays the information of transmission side terminal 101 within the transmission side terminal 101, 105 is a display operation command transmitting unit for transmitting a command necessary for changing the display within the transmission side terminal 101 to other terminals. 106 is a display operation command receiving unit for receiving a display operation command to be transmitted via a network within the reception side terminal 102, 107 is a display operating unit for updating the window display in accordance with a display operation command received within the reception side terminal 102, and 108 is the network for the interconnection of terminals 101 and 102. Note that each unit is controlled by a CPU, not shown. Or each unit corresponds to each program executed by the CPU, for example, a display change obtainable program for the display change obtainable unit.

A configuration as above presented in which the transmission side terminal and the reception side terminal are separated spatially can be utilized for a supervisory system, while a configuration in which the transmission side terminal and the reception side terminal are integrated to effect intercommunication between integrated terminals is available for the communication systems such as a teleconference system, wherein each terminal functions as both the transmission side terminal 101 and the reception side terminal 102, and is configured to include all the units from 103 to 107.

In the following, the operation of FIG. 1 will be described.

The display change obtainable unit 103 within the transmission side terminal 101 recognizes the change of display to be transmitted to the reception side terminal upon an operation instruction from the user, or by the automatic discrimination, and passes a necessary operation to the display operation command transmitting unit 105.

The display operation command transmitting unit 105 within the transmission side terminal 101 obtains destination information from the group management unit 104 which manages the information regarding the reception side terminal receiving and displaying the information of transmission side terminal 101, and transmits a command necessary for the change of display to a destination terminal.

On the other hand, within the reception side terminal 102, the display operation command receiving unit 106 receives a display operation command transmitted via the network, and the display operation unit 107 updates the window display discriminably in accordance with the display operation command received.

This change of window display is to reduce or make iconic the window display of the information if there is no change of information on the display over a fixed time period at the other terminal, when an own terminal is displaying the information from the other terminal, or to enlarge or map the window display of the information to facilitate the viewing of the user if there occurs a useful update in the information on the display. For example, if there is a large movement on the display at any other terminal, wherein the transmission side terminal discriminates the change of display information, transmits the change of display information at the reception side terminal via the network to all the terminals referring to this display information, based on this discrimination, while the reception side terminal receives this command and displays the window displaying the information which has been or will be changed at the own terminal in such condition that the user can easily see, i.e., not to be hidden by other windows.

With the above configuration, there is the effect that the display space can be effectively utilized, and the discriminable display immediately can appear when there occurs a change in the display.

In the following, this example which is used for a teleconference system will be described using FIGS. 2, 3A and 3B.

In this example, a terminal 201 and a terminal 202 are exemplary of the display screen for terminals at two sites, and further is supposed to make three-party intercommunication, including a further terminal, not shown.

Note that each terminal in this example has the transmission and reception features.

A video of the user who uses a terminal, not shown, is sent out to the network 108, and received by the display operation command receiving unit at the terminal 201, which displays the received video on a window 203. Furthermore, a host machine of the terminal 202 projects the video of the same person, or a video to be transmitted, on a window 207.

A window 204 and a window 208 is displayed with a video of the operator of the terminal 202, like the windows 203 and 207. A video of the operator of the terminal 201 is also projected onto a window 209 not shown hidden under (or behind) a window 205 and a window 210.

A window 206 and the window 210 are examples of display window based on typical softwares (e.g., a word processor software, a table drawing software, etc.) provided on the terminals 201 and 202, but not the video entered from the video input unit such as a camera not shown at the own terminal or other terminals, in which the same contents may or may not be displayed at each terminal.

Figure 3A:
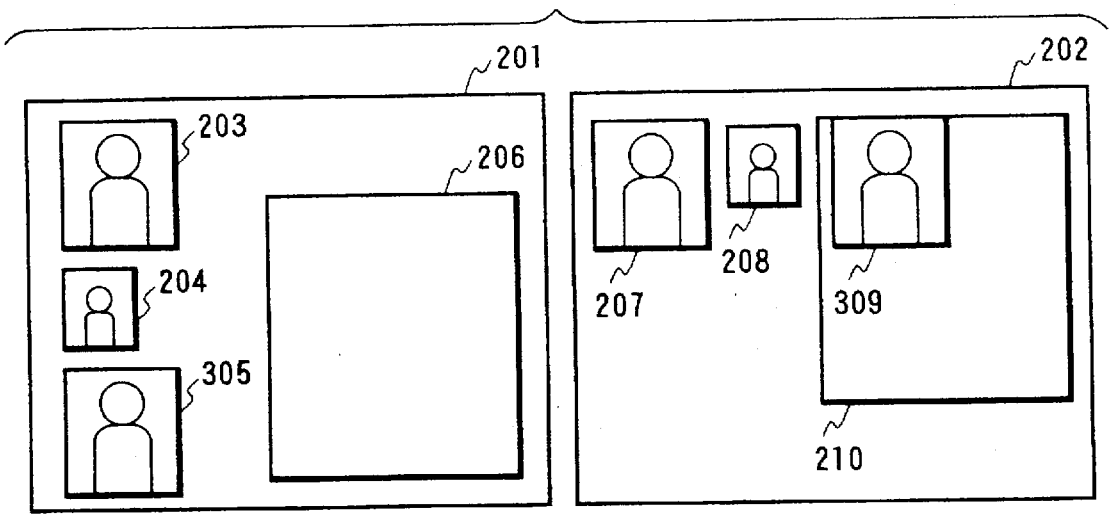
FIGS. 3A and 3B are views showing the display screen of the teleconference system which is the first example of the present invention.
Figure 3B:
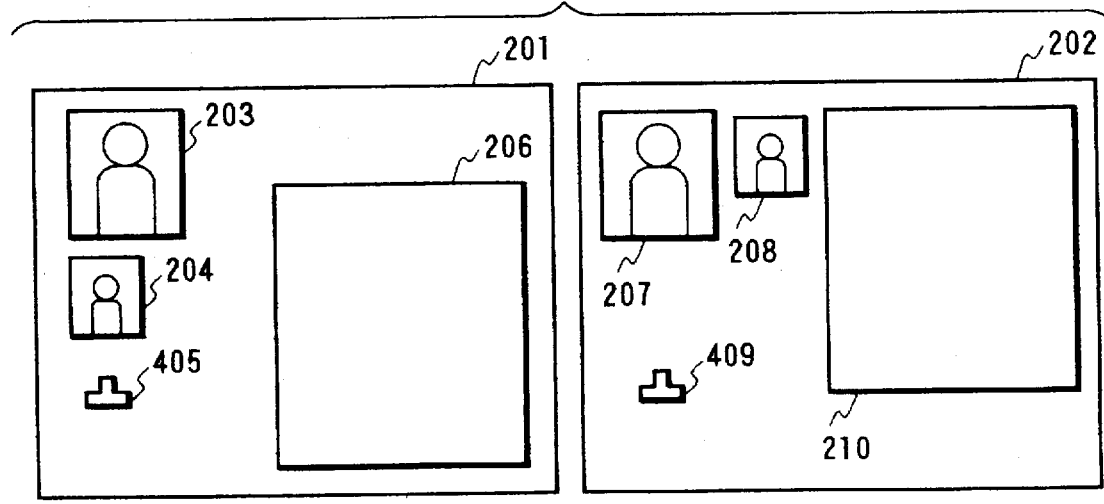

FIGS. 3A and 3B show results that the user of the terminal 201 has clicked the window 205 with a mouse cursor not shown to attract attention for the user to speak.

Figure 2:
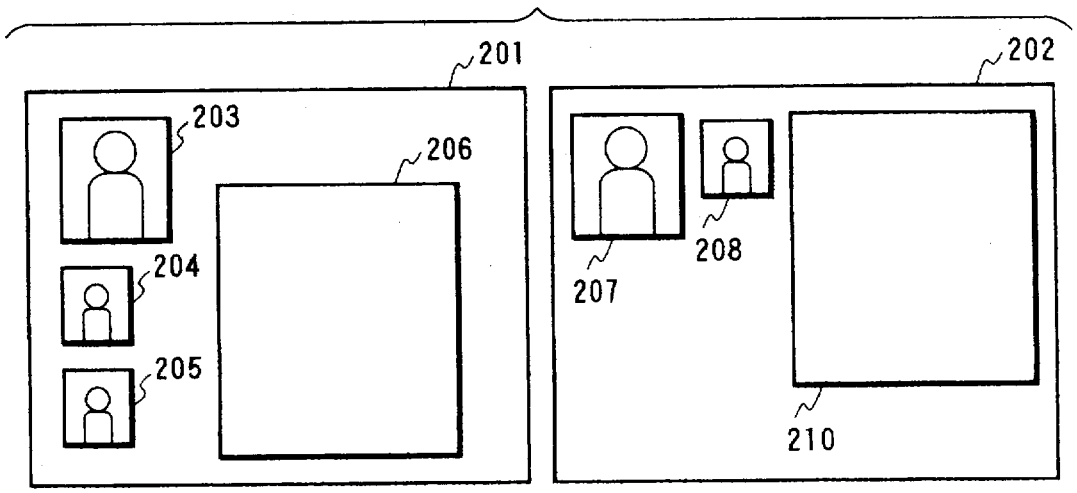
FIG. 2 is a view showing a display screen of a teleconference system which is a first example of the present invention.

The window 205 shown in FIG. 2 to which the user of terminal 201 is projected is enlarged to a window 305 in FIGS. 3A and 3B, and the window 209 displaying the same video at the terminal 202 is enlarged and mapped on screen to a window 309.

FIG. 3B shows a state in which the window 305 has been made iconic when the user at the terminal 201 does not speak or move. An icon 405 is displayed at the terminal 201 in FIG. 3B, and an icon 409 is displayed at the terminal 202.

Figures 4, 5:
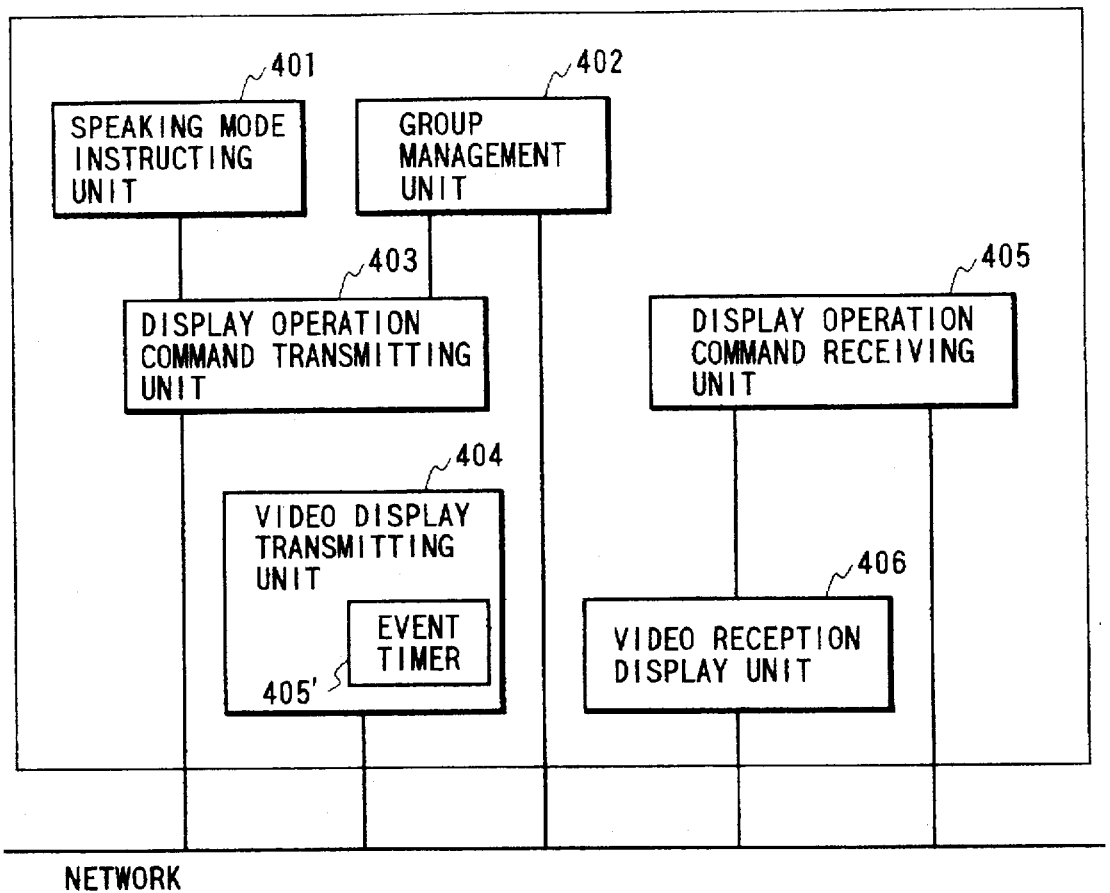
FIG. 4 is a configuration diagram of each terminal which realizes FIGS. 2, 3A and 3B.
FIG. 5 is a table showing an example of group management information.

FIG. 4 is a configuration diagram for each terminal which realizes FIGS. 2, 3A and 3B, which will be described below.

401 is a speaking mode instructing unit which is in one form of the display change obtainable unit 103, that is, to discriminate the speaker in accordance with a mouse input from the user. 402 is a group management unit for managing the information regarding a terminal which receives and displays the information from the original terminal, 403 is a display operation command transmitting unit for transmitting a command necessary for changing the display from the original terminal to other terminals, 404 is a video display transmitting unit for transmitting the video from a camera, not shown, to other terminals, as well as receiving and displaying it on the display, 405 is a display operation command receiving unit for receiving a display operation command to be transmitted from other terminals via the network, and 406 is a video reception display unit for receiving the video obtained via the network and displaying it on the display, while updating the size of window and the mapping state in accordance with the display operation command received.

Figure 6:
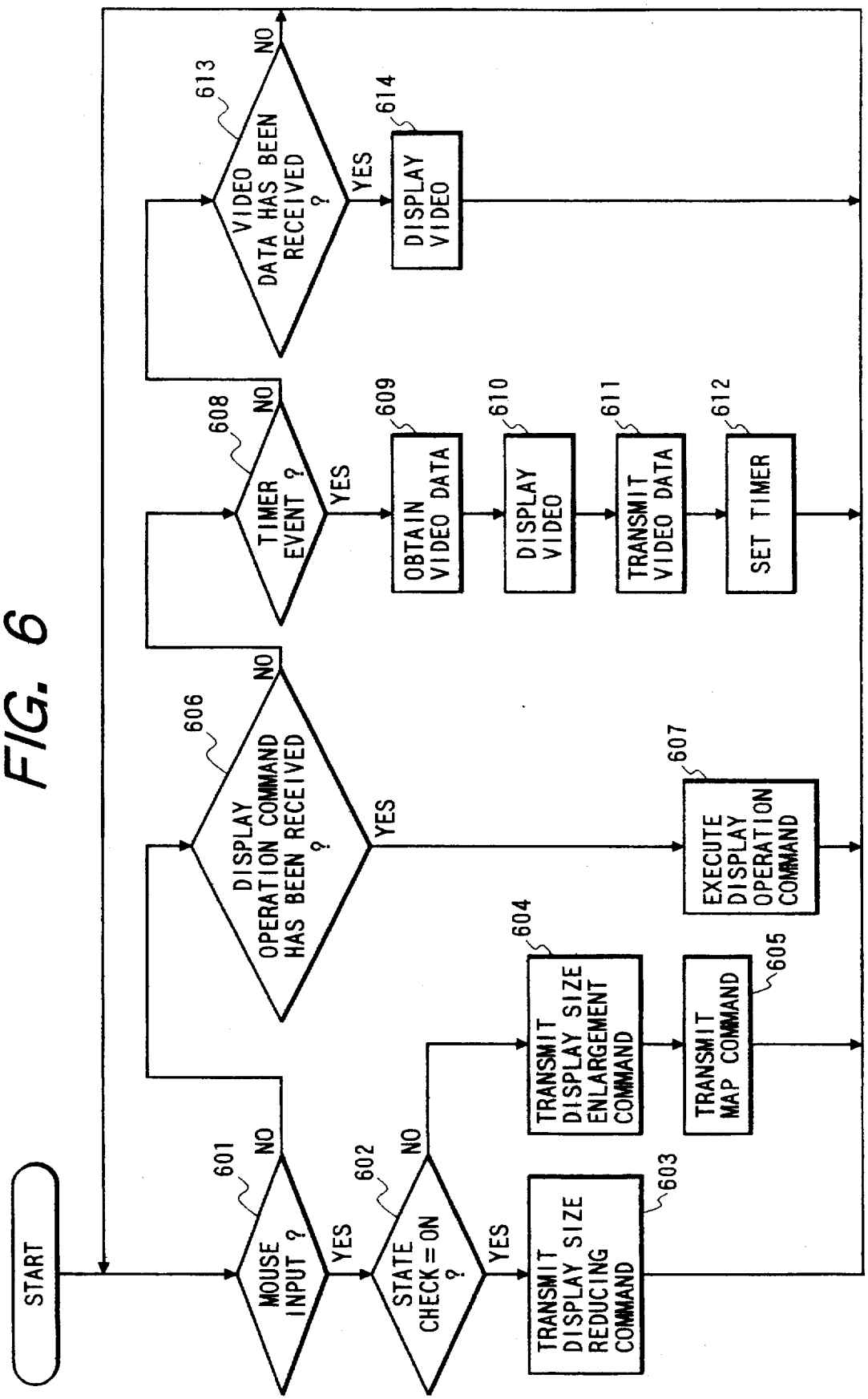
FIG. 6 is a flowchart showing the operation of a terminal as shown in FIG. 4.

Referring now to FIG. 6, the flow of the processing at the transmission side terminal as shown in FIG. 4 will be described.

First, the speaking mode instructing unit 401 receives a mouse input from the user (step 601), and instructs the display operation command transmitting unit 403 to change the size of input window and the mapping state thereof.

The display operation command transmitting unit 403 is based on the information of the group management unit 402 which manages the information being displayed at the terminal (step 602), and if the current display state is ON (e.g., display is enlarged and mapped on screen to make the display more conspicuous), it sets the display state to OFF (e.g., display is reduced to make the display less conspicuous) and transmits a display size reduction command, while if the current display state is OFF, it sets the display state to ON and transmits a display size enlargement command to the terminal which receives and displays the information from the original terminal (steps 603, 604, and 605).

Independently of this, the video display transmitting unit 404 accords with a timer event such as a timer interrupts at every fixed time from an event timer 405' contained inside thereof (step 608), displaying a video from the camera, not shown, on the display (steps 609, and 610), transmitting video data to the terminal receiving and displaying the information from the original terminal, based on the information of the group management unit 402 (step 611), and setting the timer to the next video transmission time (step 612). At a set time of the timer 405, the transmission of video automatically occurs according to the event timer.

Also, the video reception display unit 406 receives video data from other terminals (step 613), and displays it on the display (step 614). Also, the display operation command receiving unit 405 receives a display operation command sent from other terminals via the network (step 606), and resets the size of window and the mapping state in the video reception display unit 406 (step 607).

Note that when the communication line is established with each terminal, the display state is set to OFF, each video display window is activated in a mode of displaying in reduced size.

Also, instead of the display in reduced size, a so-called icon may be used, which represents a specific small image.

FIG. 5 is an example of group management information, wherein the group management unit of each terminal stores the name of a remote terminal (or host machine) for communicating the video and the number of communication port to a program for controlling the video display on each host.

In the following, a procedure for group management will be described.

At the initial state, no group management information is registered in the group management unit at each terminal.

Upon the initiation of a video display control program at each reception terminal, the group management information is registered in order.

The video display program at the reception terminal is initiated with the name of the transmission side terminal (host machine) and the port number designated, upon an instruction from the user or in accordance with a conference management program, not shown.

At the reception side terminal, a port for receiving the display operation command is opened, and a new registration command, the own terminal (host machine) name and the reception port number are communicated to a designated port for the transmission terminal.

At the transmission side terminal, the reception terminal (host machine) name and the port number received from the reception side terminal are registered in the group management information in accordance with the new registration command.

Also, at the reception side terminal, upon termination, a close command, the terminal (host machine) name and the reception port number are sent to the transmission side terminal, where a transmission side program deletes the corresponding items from the group management information.

Note that the enlargement and reduction processing can be implemented through the well known interpolation and thinning of the video received by the CPU, not shown.

The icon may be an image with a transmitted image reduced by said reduction processing. Or the icon may be prememorized in a ROM not shown for the terminal during communication and read from the ROM and displayed. Or the icon may be created by the user at the terminal, and saved. In essence, it suffices that the icon may allow the user to recognize the communication state.

As above described, if there is no change in the display information for a fixed time on the window display of video information received from other terminals and video information input at the own terminal, the window displaying that information is reduced or made iconic, or if there occurs an update useful for the display information, for example, if there is a large movement on the display at any other terminal, the window displaying that information is enlarged or mapped so that the user can see more easily, i.e., not to be hidden by other windows, whereby there is the effect that the display space can be effectively utilized, and if there occurs a change on the display, the discriminable display can be immediately made.

(Second Example)

A second example will be described in connection with a supervisory system in which one terminal supervises the videos from a plurality of sites.

Figure 7:
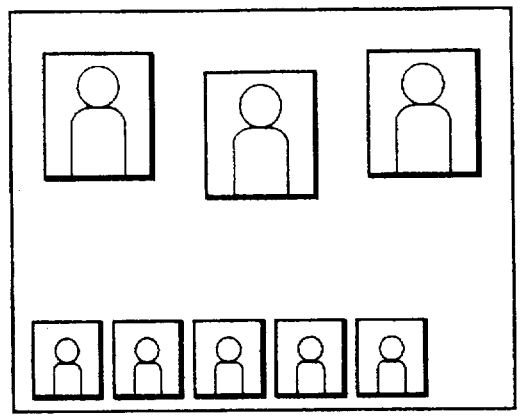
FIG. 7 is a view showing a display screen of a supervisory system which is one example of the present invention.

FIG. 7 is a display screen of the supervisory system according to this example, wherein windows in reduced size of the videos transmitted from the sites under supervision are arranged on the lower end side of screen, and multiple windows of larger and clear size are presented on the other section.

Figure 8:
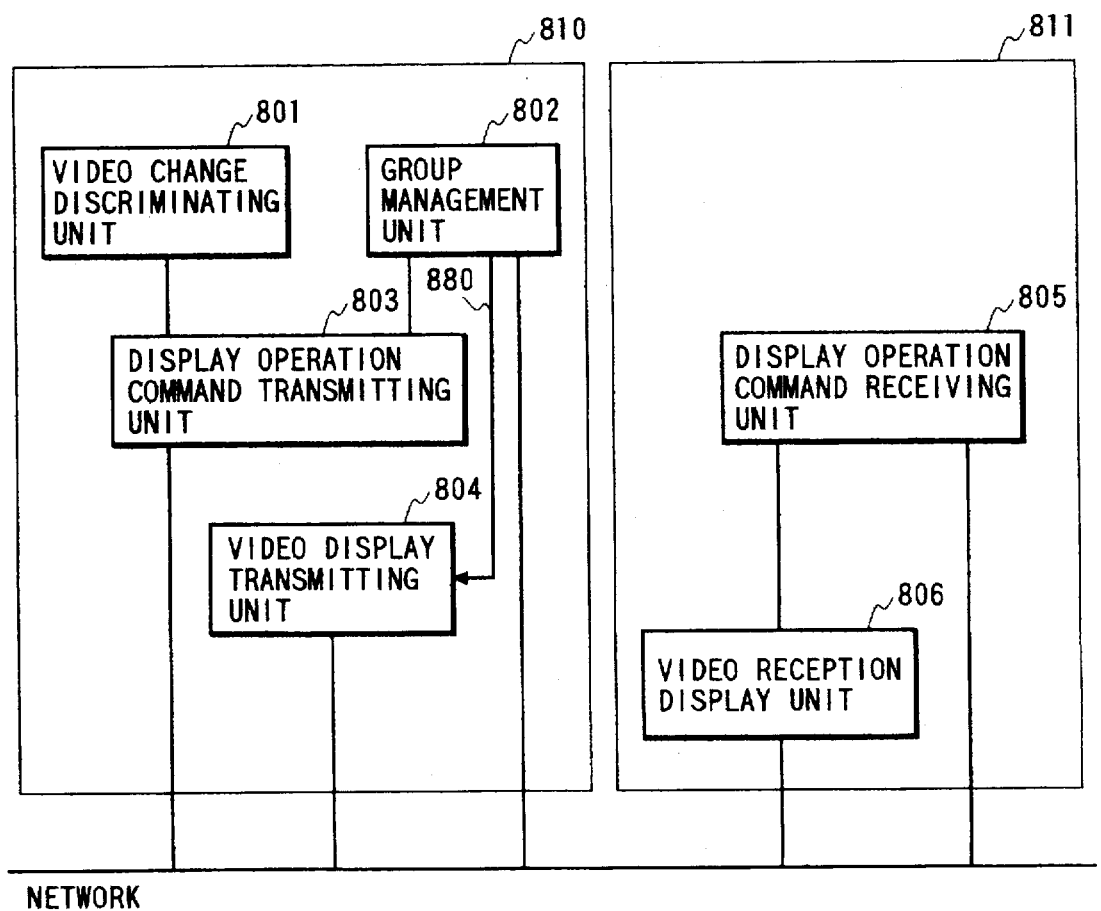
FIG. 8 is a diagram showing the configuration of the supervisory system which is one example of the present invention.

FIG. 8 is a diagram showing the configuration of the supervisory system according to this example.

810 is a transmission side terminal placed at each site, and 811 is a reception side terminal for the observation of video.

Also, 801 is a video change discriminating unit for discriminating the change of video to be transmitted within the transmission side terminal, which is in one form of the display change obtainable unit 103, 802 is a group management unit for managing the information regarding a terminal which receives and displays the information from the original terminal, 803 is a display operation command transmitting unit for transmitting (a command necessary for changing the display from a transmission) side terminal 810 to a reception side terminal 811, and 804 is a video display transmitting unit for transmitting the video from a camera, not shown, to other terminals, as well as receiving and displaying it on the display.

On the other hand, the reception side terminal will be described below.

805 is a display operation command receiving unit for receiving a display operation command to be transmitted from other terminals via the network, and 806 is a video reception display unit for receiving the video obtained via the network and displaying it on the display, while updating the size of window and the mapping state in accordance with the display operation command received by the original terminal 102.

Herein, the group management unit 802 is the same as the group management unit 402 of the first example. Similarly, the display operation command transmitting unit 803, the video display communication unit 804, the display operation command receiving unit 805, and the video reception display unit 806 are the same as the display operation command transmitting unit 403, the video display communication unit 404, the display operation command receiving unit 405, and the video reception display unit 406 of the first example, respectively.

Figure 9:
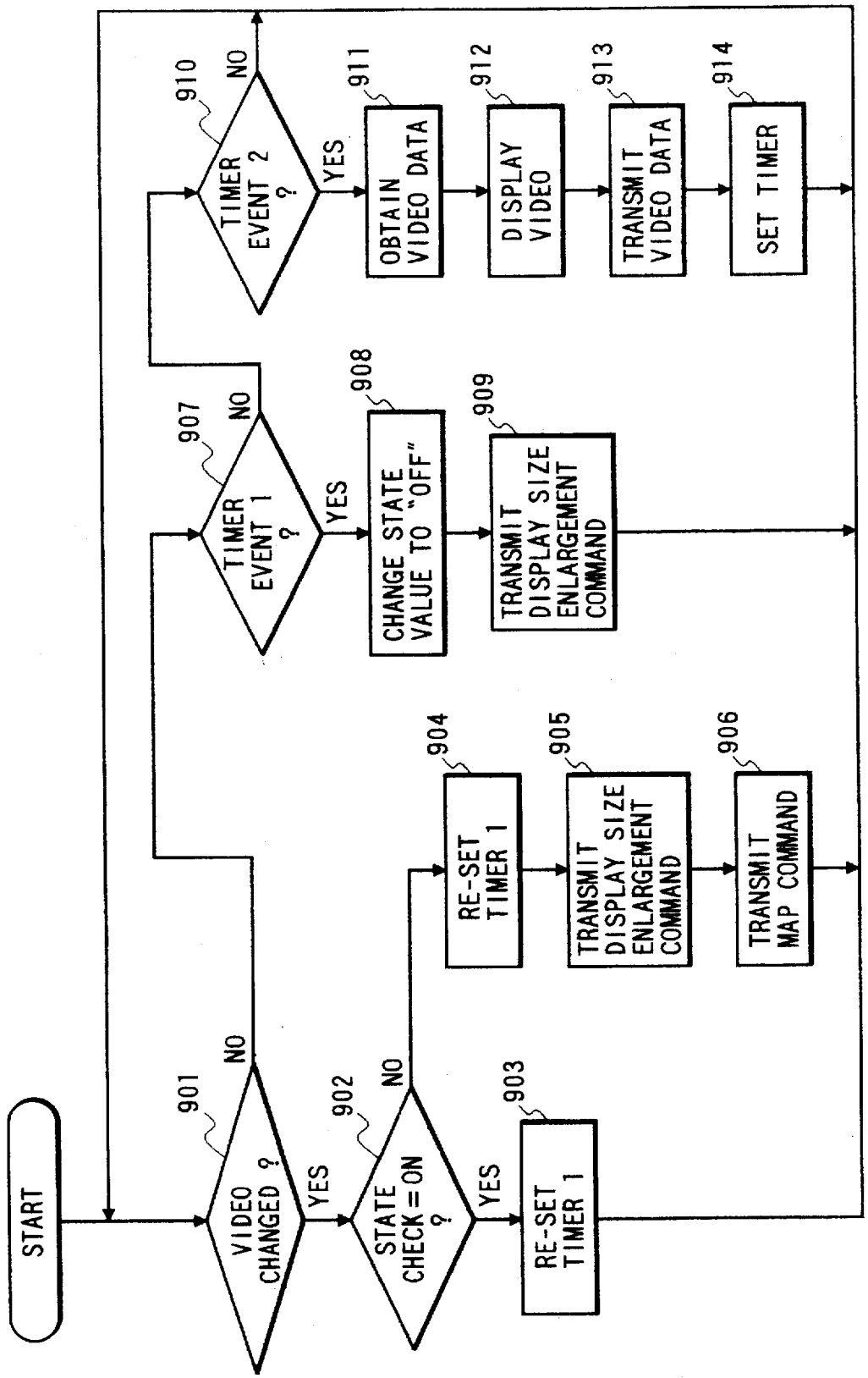
FIG. 9 is a flowchart showing the operation of a terminal on the transmission side as shown in FIG. 8.

FIG. 9 is a flowchart showing the flow of processing operation at the transmission side terminal as shown in FIG. 8.

First, the video change discriminating unit 801 discriminates whether or not there is any change in the video obtained from the camera, not shown (step 901), and then discriminates whether or not the current state is ON, i.e., the display is made in a larger window as shown in FIG. 7, if there is any change in the video (step 902). And if the current state is ON (larger display), the set time of timer 1 is set to the current time +s0 (s0 is 5 seconds, for example) (step 903). If the current state is OFF (smaller display), the state is set to ON (larger display), and the current time of timer 1 is set to the current time +s0 (step 904). Further, the display operation command transmitting unit 803 is demanded to change the size of video display window and the mapping state.

The display operation command transmitting unit 803 transmits a display size enlargement command and a map command to the terminal receiving and displaying the information from the original terminal, based on the information of the group management unit 802 (steps 905, and 906).

On the other hand, the set timer 1 runs out when there is no change in the video within a time period of s0, whereby in accordance with this timer event 1 (step 907), the current state is set to OFF (smaller display) (step 908), and the display operation command transmitting unit 803 is demanded to reduce the video display window. The display operation command transmitting unit 803 transmits a display size reduction command to the terminal receiving and displaying the information from the original terminal, based on the information of the group management unit 802 (step 909).

Independently of this, the video display transmitting unit 804, in accordance with the timer event 2 (step 910), displays a video from the camera, not shown, on the display at the sender terminal (steps 911, 912), as well as transmitting video data to the terminal receiving and displaying the information from the original terminal, based on the information 880 of the group management unit 902 (step 913), and sets the timer 2 to the next video transmission time (step 914).

Figure 10:
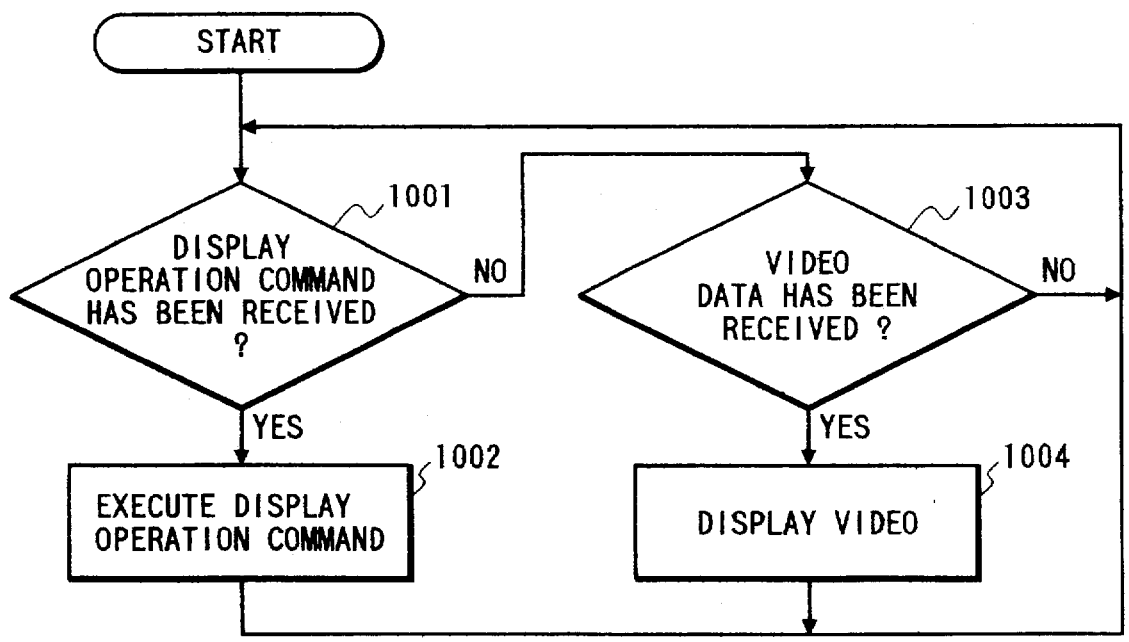
FIG. 10 is a flowchart showing the operation of a terminal on the reception side as shown in FIG. 8.

FIG. 10 is a flowchart showing the flow of operation processing at the reception side terminal as shown in FIG. 8.

The display operation command receiving unit 805 receives a display operation command transmitted via the network from other terminals (step 1001), and resets the size of window and the mapping state on the video reception display unit 806 (step 1002).

The video reception display unit 806, upon arrival of video data from the transmission terminal (step 1003), displays it on the display (step 1004).

Note that the display state of window is set to OFF (smaller display) when the program is initiated, whereby each video display window is activated in a mode of displaying in reduced size.

Figure 11:
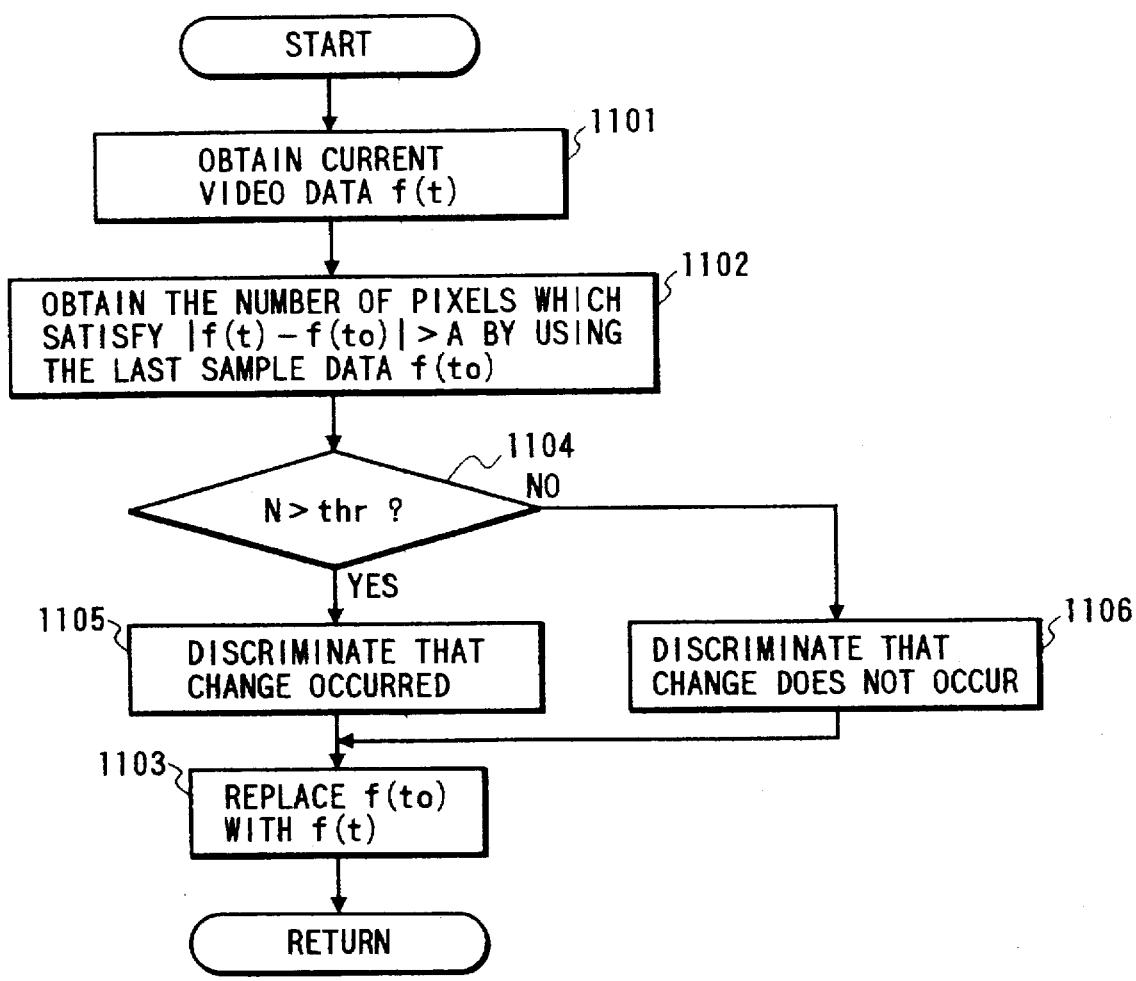
FIG. 11 is a flowchart showing the operation of a video change discriminating unit 801.

FIG. 11 is a flowchart showing the operation of the video change discriminating unit 801.

The video change discriminating unit 801 first obtains video data f(t) at the current time (step 1101), and compares it with the video data f(t0) at the previous sample time for each pixel, and if the condition.

$$|f(t)-f(t0)|>A, A \text{ is a threshold value}$$

is satisfied, the number of pixels at which video data is changed with the time is counted (step 1102). If the counted number N of pixels satisfies the expression $$N>thr, thr \text{ is a threshold value}$$

any change is returned, or otherwise no change is returned.

To proceed to the next sample time from the current time, t0←t, and the video data f(t0) is replaced with f(t) for the comparison. Then, the operation goes back to step 1102 of FIG. 11.

Thereby, it is possible to display only the video image that has been changed more obviously by eliminating the wasteful display space also in the supervisory system. Also, in the normal supervisory service, it is only necessary that the user pay attention to the changed video image, and does not need to notice which video image has been changed, whereby there is the effect that the fatigue or overlook of the supervisor can be prevented.

(Third Example)

While in the first example, the display change obtainable unit 103 took the form of the speaking mode instructing unit 401 in which the user directly instructs the speaking mode with a click of mouse, it should be understood that instead of the speaking mode instructing unit 401 in FIG. 4, a speaking mode detecting unit may be used which automatically discriminates based on the video or audio information whether or not the speaking will be effected or any change in the condition will occur.

In this case, in the flowchart of FIG. 6, step 601 is a change detecting step, and the state value is updated within the change detecting step, the state check determination is reversed such that, $$\text{State value=OFF}$$

Figure 12:
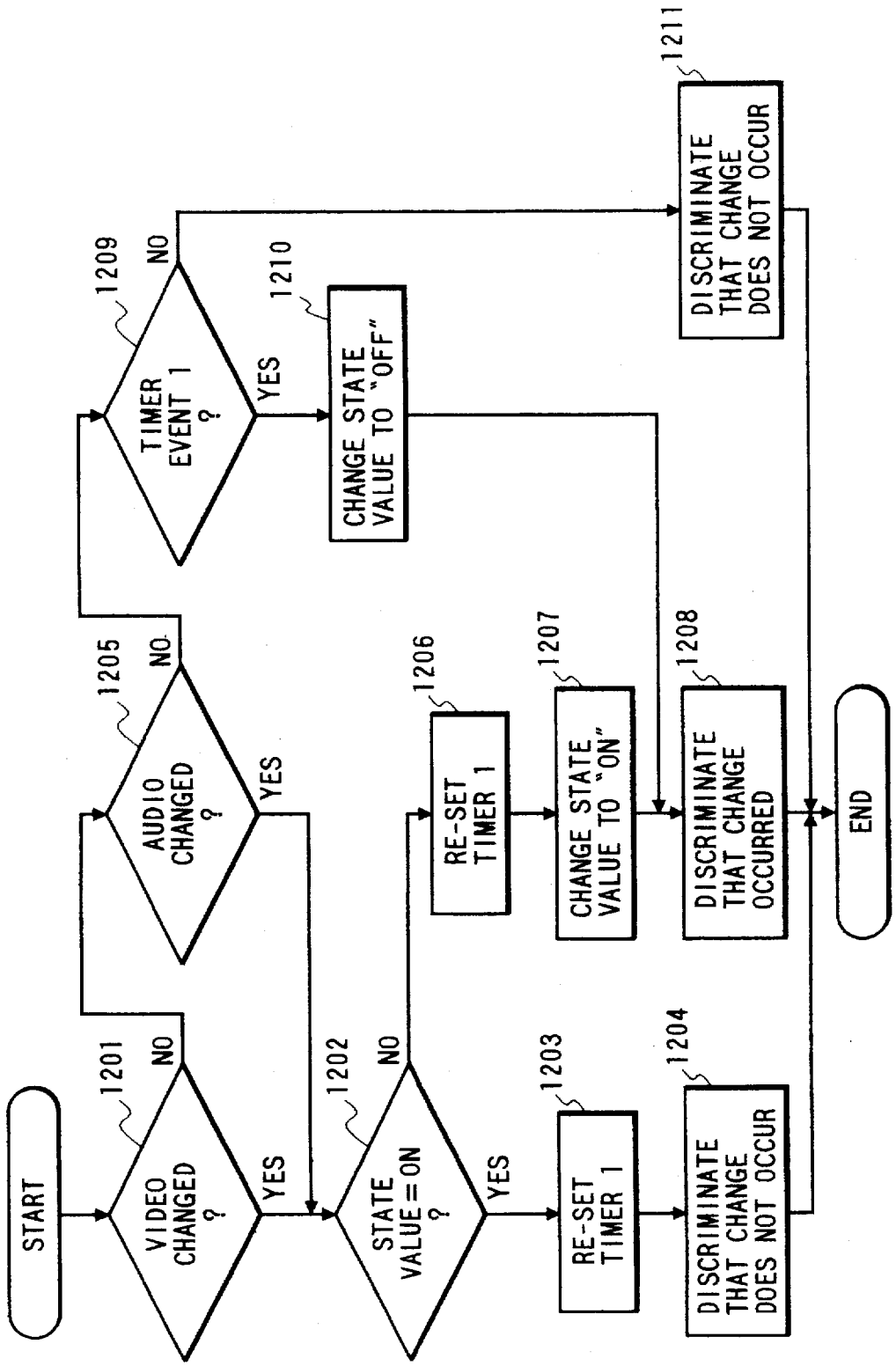
FIG. 12 is a flowchart showing the operation of a change detection step in a speaking mode detection unit.

FIG. 12 is a flowchart showing the operation of the change detecting step in the speaking mode detecting unit.

The speaking mode detecting unit discriminates the change of video (step 1201), and then discriminates the change of audio if there is not a change of video (step 1205). If there is any change, it refers to the current state value (step 1202) to reset the set time of timer 1 to the current time +s0 (s0 is five seconds, for example) and determines that there is no change, if the current state value is ON (larger display) (step 1203).

Note that such timer 1 starts to clock immediately after the time is set, and issues an event at the set time.

If the current state is OFF (smaller display), the set time of timer 1 is reset to the current time +s0 (step 1206), and set the state value to ON (larger display) and determines that there is any change (steps 1207, and 1208).

At the same time, if a timer event 1 of the timer 1 occurs (step 1209), the state value is set to OFF (smaller display) (step 1210), and it is determined whether any change occurred. If there is no change of video and audio and no timer event 1, it is determined that no change occurred.

Figure 13:
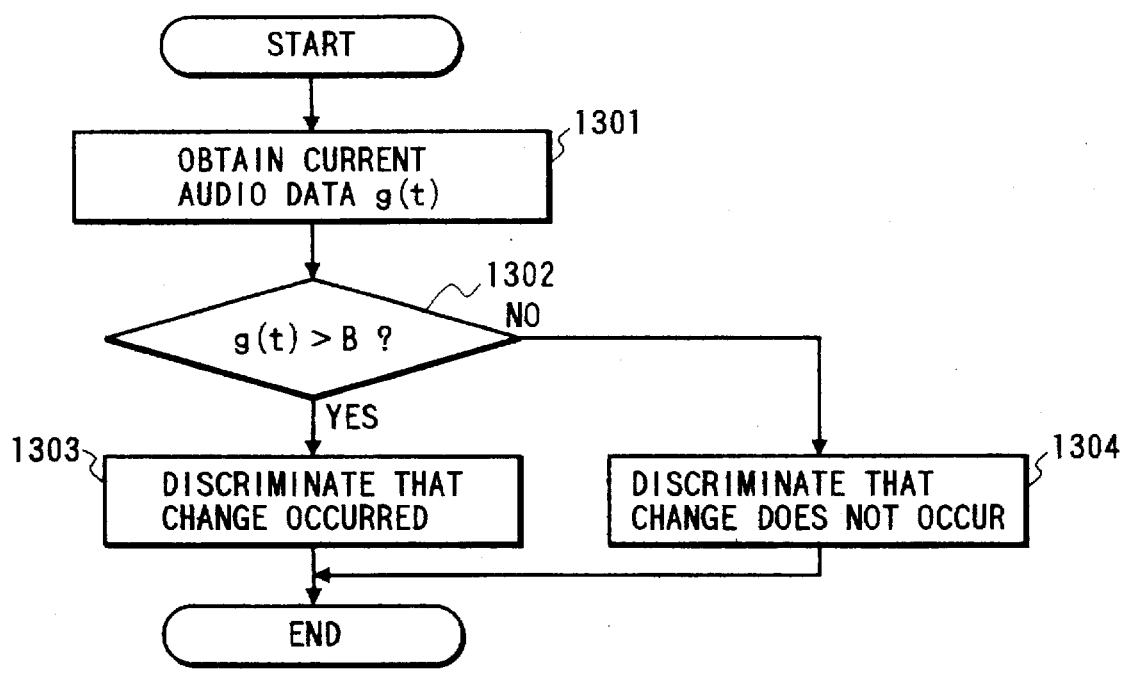
FIG. 13 is a flowchart showing a procedure for discriminating the audio change.

The discrimination of video change can be effected according to the same procedure as in the example 2. FIG. 13 is a flowchart showing the procedure for discriminating the change of audio.

First, the audio data g(t) at the current time is obtained (step 1301), and compared with a threshold value B (step 1302) such that, $$g(t)>B$$

whereby if it is greater than B, it is determined that any change occurred or otherwise no change occurred (step 1304).

With such configuration, when any change of audio or video occurs, the display at the reception terminal side is set automatically to the speaking mode (enlarged and map display), or when the audio or video is not changed for more than a specified time, the corresponding display area at the reception terminal side is automatically reduced to eliminate waste.

As above described, according to the present invention, the display of the video received from a plurality of communication terminals or video input terminals can be effected satisfactorily in accordance with the state at the transmission terminal side. For example, since the multi-window is configured in which each of multiples pieces of information appears within a window on the monitor, the video can be controlled upon a command form the transmission side terminal which transmit the video, despite the degraded discrimination which arises when a window having necessary information displayed may be hidden by other windows, so that the window necessary for the user can be discriminated, taking effect that the recognition ability can be improved.

The present invention allows for a variety of variations within the scope as defined by the ensuing claims.

What is claimed is:

1. A communication apparatus comprising:
   input means for inputting a video signal;
   discriminating means for discriminating that a video represented by the video signal is not active for a predetermined time; and
   control means for causing an icon to be displayed in place of the video signal input by said input means in accordance with a discrimination by said discriminating means.

2. An apparatus according to claim 1, wherein said icon is represented by a signal obtained by reducing the video signal.

3. An apparatus according to claim 1, wherein said icon is an icon registered by user.

4. An apparatus according to claim 1, wherein said discriminating means discriminates that the video represented by the video signal is not moved for a predetermined time period.

5. An apparatus according to claim 1, wherein said input means is a video camera.

6. An apparatus according to claim 1, further comprising display means for displaying the video represented by said video signal, and wherein said control means is means for causing an icon to be displayed in place of the video displayed on said display means.

7. An apparatus according to claim 1, further comprising transmitting means for transmitting the video signal input by said input means.

8. An apparatus according to claim 7, wherein said control means causes said icon to be transmitted in place of the video signal transmitting by said transmitting means.

9. A transmission apparatus comprising:
   generating means for generating a video signal to be transmitted;
   discriminating means for discriminating that the video signal generated by said generating means is not active; and
   transmitting means for transmitting said video signal generated by said generating means, and transmitting a predetermined icon in place of the video signal in accordance with a discrimination by said discriminating means.

10. An apparatus according to claim 9, wherein said icon is represented by a signal obtained by reducing the video signal.

11. An apparatus according to claim 9, wherein said icon is an icon registered by user.

12. An apparatus according to claim 9, wherein said discriminating means discriminates that the video represented by said video signal is not moved for a predetermined time period.

13. An apparatus according to claim 9, wherein said generating means is a video camera.

14. A receiving apparatus comprising:
    first receiving means for receiving a video signal;
    second receiving means for receiving a command regarding a display form of the video signal; and
    control means for causing a predetermined icon to be displayed in place of the video signal received by said first receiving means in accordance with the command received by said second receiving means.

15. An apparatus according to claim 14, wherein said icon is represented by a signal obtained by reducing the video signal.

16. An apparatus according to claim 14, wherein said icon is an icon registered by user.

17. An apparatus according to claim 14, further comprising display means for displaying the video represented by the video signal, wherein said control means is means for causing an icon to be displayed in place of the video displayed on said display means.

18. A communication method comprising steps of:
    inputting a video signal;
    discriminating that the video represented by the video signal is not active for a predetermined time period; and
    causing an iron to be displayed in place of the video signal input in accordance with a discrimination in said discriminating step.

19. A method according to claim 18, wherein said icon is represented by a signal obtained by reducing the video signal.

20. A method according to claim 18, wherein said icon is an icon registered by user.

21. A method according to claim 18, wherein said discriminating step discriminates that the video represented by the video signal is not moved for a predetermined time period.

22. A method according to claim 18, wherein the video signal is input from a video camera.

23. A method according to claim 18, further comprising steps of displaying the video represented by the video signal on display means, and causing an icon to be displayed in place of the video displayed on the display means.

24. A method according to claim 18, further comprising a step of transmitting an input video signal.

25. A method according to claim 24, further comprising a step of causing said icon to be transmitted in place of the video signal to be transmitted.

26. A transmission method comprising steps of:
    generating a video signal to be transmitted;
    discriminating that the generated video signal is not active; and
    causing a predetermined icon to be transmitted in place of the video signal in accordance with a discrimination in said discriminating step when transmitting the generated video signal generated.

27. A method according to claim 26, wherein said icon is represented by a signal obtained by reducing the video signal.

28. A method according to claim 26, wherein said icon is an icon registered by user.

29. A method according to claim 26, wherein said discriminating step discriminates that the video represented by the video signal is not moved for a predetermined time period.

30. A method according to claim 26, wherein the video signal is generated by a video camera.

31. A receiving method comprising steps of:
    receiving a video signal;
    receiving a command regarding a display form of the video signal; and
    causing a predetermined icon to be displayed in place of the video signal received in accordance with the received command.

32. A method according to claim 31, wherein said icon is represented by a signal obtained by reducing the video signal.

33. A method according to claim 31, wherein said icon is an icon registered by user.

34. A method according to claim 31, further comprising a step of displaying the video represented by said video signal, and wherein said causing step is a step of causing an icon to be displayed in place of the video displayed in said displaying step.

* * * * *

UNITED STATES PATENT AND TRADEMARK OFFICE
CERTIFICATE OF CORRECTION

PATENT NO. : 5,751,959

DATED : May 12, 1998

INVENTOR(S) : HIROAKI SATO, ET AL.

Page 1 of 3

It is certified that error appears in the above-identified patent and that said Letters Patent is hereby corrected as shown below:

Title page,

At [56] References Cited

"3278784 12/1991 Japan
6141310 5/1994 Japan" should read --3-278784 12/1991 Japan
6-141310 5/1994 Japan--

Column 2

Line 33, "showing," should read --showing--.

Column 3

Line 65, "is" should read --are--.

Column 5

Line 2, "(steps 609," should read --(steps 609--; and
Line 16, "OFF" should read --OFF and--.

UNITED STATES PATENT AND TRADEMARK OFFICE
CERTIFICATE OF CORRECTION

PATENT NO. : 5,751,959　　　　　　　　　　　Page 2 of 3
DATED : May 12, 1998
INVENTOR(S) : HIROAKI SATO, ET AL.

It is certified that error appears in the above-identified patent and that said Letters Patent is hereby corrected as shown below:

Column 7

```
    Line 13, "(steps 905," should read --(steps 905--; and
    Line 54, "condition." should read --condition--.
```

Column 9

```
    Line 4, "multiples" should read --multiple--;
    Line 6, "form" should read --from--;
    Line 7, "transmit" should read --transmits--;
    Line 46, "transmitting" first occurrence should read
    --transmitted--.
```

Column 10

```
    Line 21, "steps" should read --the steps--;
    Line 25, "iron" should read --icon--;
    Line 48, "steps" should read --the steps--; and
    Line 56, "signal generated" should read --signal--.
```

UNITED STATES PATENT AND TRADEMARK OFFICE
CERTIFICATE OF CORRECTION

PATENT NO. : 5,751,959
DATED : May 12, 1998
INVENTOR(S) : HIROAKI SATO, ET AL.

It is certified that error appears in the above-identified patent and that said Letters Patent is hereby corrected as shown below:

Column 11

Line 1, "steps" should read --the steps--.

Signed and Sealed this

Ninth Day of February, 1999

Attest:

Attesting Officer

Acting Commissioner of Patents and Trademarks